United States Patent
Okiga et al.

(10) Patent No.: US 11,271,260 B2
(45) Date of Patent: Mar. 8, 2022

(54) BATTERY PACK AND METHOD OF DISASSEMBLING THE BATTERY PACK

(71) Applicants: TOYOTA JIDOSHA KABUSHIKI KAISHA, Aichi (JP); SUBARU CORPORATION, Tokyo (JP)

(72) Inventors: Hiroshi Okiga, Toyota (JP); Satoru Seyama, Tokyo-to (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/090,840

(22) Filed: Nov. 5, 2020

(65) Prior Publication Data

US 2021/0175554 A1 Jun. 10, 2021

(30) Foreign Application Priority Data

Dec. 6, 2019 (JP) .............................. JP2019-221548

(51) Int. Cl.
*H01M 50/183* (2021.01)
*H01M 50/147* (2021.01)
*H01M 10/54* (2006.01)

(52) U.S. Cl.
CPC ......... *H01M 10/54* (2013.01); *H01M 50/147* (2021.01); *H01M 50/183* (2021.01)

(58) Field of Classification Search
CPC .................................................. H01M 50/147
See application file for complete search history.

(56) References Cited

U.S. PATENT DOCUMENTS

| | | | | |
|---|---|---|---|---|
| 2012/0251863 | A1* | 10/2012 | Berger | H01M 50/147 429/99 |
| 2016/0293914 | A1* | 10/2016 | Miller | H01M 50/20 |
| 2018/0045785 | A1 | 2/2018 | Kodama et al. | |
| 2019/0027723 | A1* | 1/2019 | Erb | H01M 50/24 |

FOREIGN PATENT DOCUMENTS

JP 201828967 A 2/2018

\* cited by examiner

*Primary Examiner* — Brian R Ohara
(74) *Attorney, Agent, or Firm* — Hauptman Ham, LLP

(57) ABSTRACT

A battery pack may include a tray, a cover, a connection member connecting a peripheral portion of the tray to a peripheral portion of the cover with a clearance provided therebetween, and a sealant filling the clearance. The connection member may include a spacer disposed in a range between the peripheral portion of the tray and the peripheral portion of the cover. The spacer may include first to third portions respectively having first to third cross-sectional areas. The second cross-sectional area may be smaller than the first and third cross-sectional areas. The first portion may be disposed at a position that is in contact with the peripheral portion of the tray. The third portion may be disposed at a position that is in contact with the peripheral portion of the cover. The second portion may be disposed between the first portion and the third portion.

4 Claims, 15 Drawing Sheets

BATTERY PACK AND METHOD OF DISASSEMBLING THE BATTERY PACK

CROSS-REFERENCE TO RELATED APPLICATION

This application claims priority to Japanese Patent Application No. 2019-221548 filed on Dec. 6, 2019, the contents of which are hereby incorporated by reference into the present application.

TECHNICAL FIELD

The technique disclosed herein relates to a battery pack.

BACKGROUND

Japanese Patent Application Publication No. 2018-028967 describes a technique for removing a battery cell from a used battery pack to reuse the battery cell.

SUMMARY

Restoring a battery pack enables the battery pack to be used for a prolonged time. For example, replacing a component (e.g., a deteriorated battery cell) inside a battery pack enables the battery pack to be used for a prolonged time. Meanwhile, in conventional battery packs, a tray and a cover are joined to each other to prevent entry of moisture into the battery pack. Therefore, it is difficult to remove the cover from the tray in a manner allowing the cover to be reused, and thus it is difficult to restore the battery pack. The disclosure herein proposes a battery pack that enables its cover to be removed from a tray in a manner allowing the cover to be reused.

A battery pack disclosed herein may comprise: a tray comprising a peripheral portion; a cover covering the tray and comprising a peripheral portion that faces the peripheral portion of the tray; a connection member connecting the peripheral portion of the tray and the peripheral portion of the cover to each other with a clearance provided between the peripheral portion of the tray and the peripheral portion of the cover; and a sealant filling the clearance. The connection member may comprise a spacer disposed in a range between the peripheral portion of the tray and the peripheral portion of the cover in a direction along which the tray and the cover are stacked. The spacer may comprise a first portion having a first cross-sectional area in a cross section of the spacer along a plane parallel to the clearance, a second portion having a second cross-sectional area in a cross section of the spacer along a plane parallel to the clearance, and a third portion having a third cross-sectional area in a cross section of the spacer along a plane parallel to the clearance. The second cross-sectional area may be smaller than the first cross-sectional area and the third cross-sectional area. The first portion may be disposed at a position that is in contact with the peripheral portion of the tray. The third portion may be disposed at a position that is in contact with the peripheral portion of the cover. The second portion may be disposed between the first portion and the third portion.

In the above battery pack, the connection member connects the peripheral portion of the tray and the peripheral portion of the cover to each other with the clearance provided between the peripheral portion of the tray and the peripheral portion of the cover. Further, the sealant fills the clearance between the peripheral portion of the tray and the peripheral portion of the cover. To remove the cover from the tray in this battery pack, the sealant and the spacer of the connection member are cut by inserting a saw in the clearance and moving the inserted saw along the clearance. The cutting of the sealant and the spacer enables removal of the cover from the tray. If the inserted saw contacts the tray or the cover during the cutting of the spacer, the tray or the cover may be thereby damaged. To address this, the spacer comprises the first to third portions in the above battery pack. The first portion and the third portion, which have the larger cross-sectional areas, are disposed at positions that are in contact with the tray and the cover, respectively, and the second portion, which has the smaller cross-sectional area, is disposed between the first portion and the third portion. Therefore, the spacer guides the saw to move along the second portion during the cutting of the spacer. Thus, the inserted saw is prevented from contacting the tray or the cover. As described, the above battery pack enables the cover to be removed from the tray while preventing damage to the tray and the cover. Thus, the battery pack can be reused once the cover and the tray are assembled together again.

DETAILED DESCRIPTION

Figure 1:
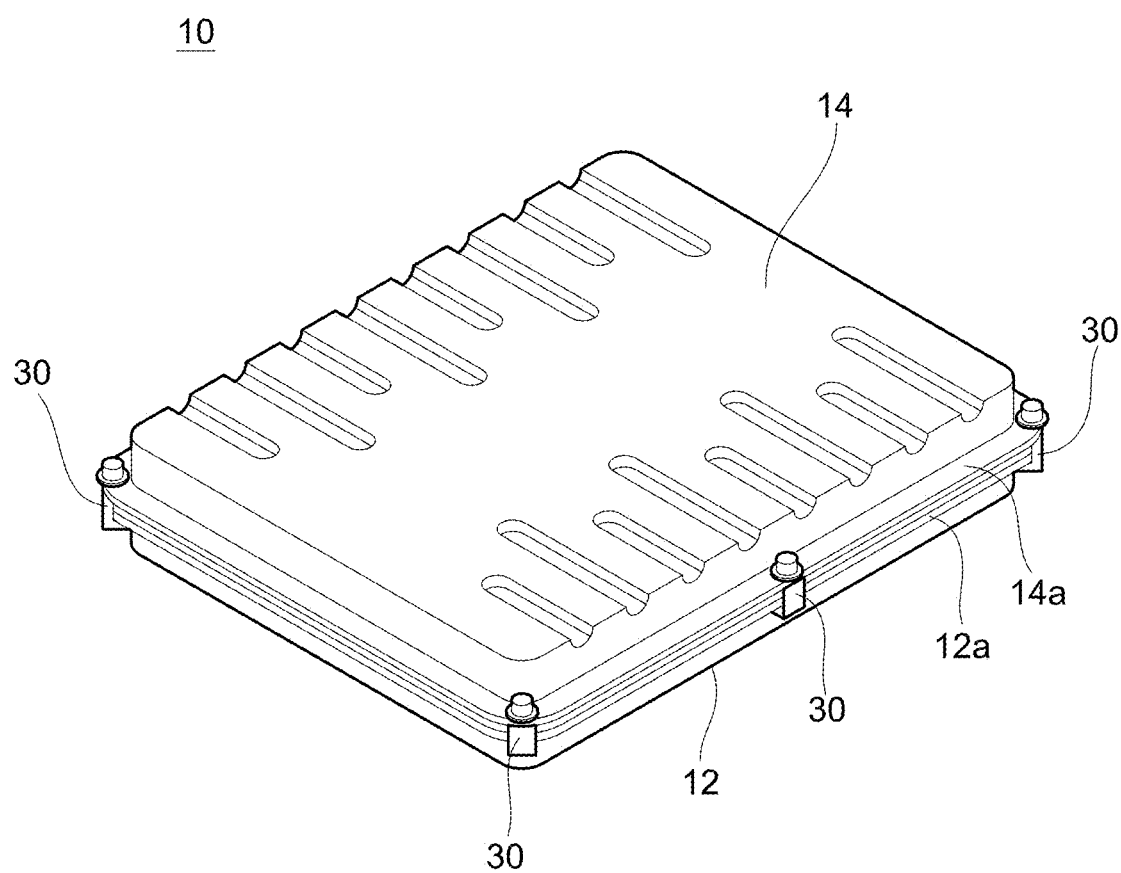
FIG. 1 is a perspective view of a battery pack according to an embodiment.
Figure 2:
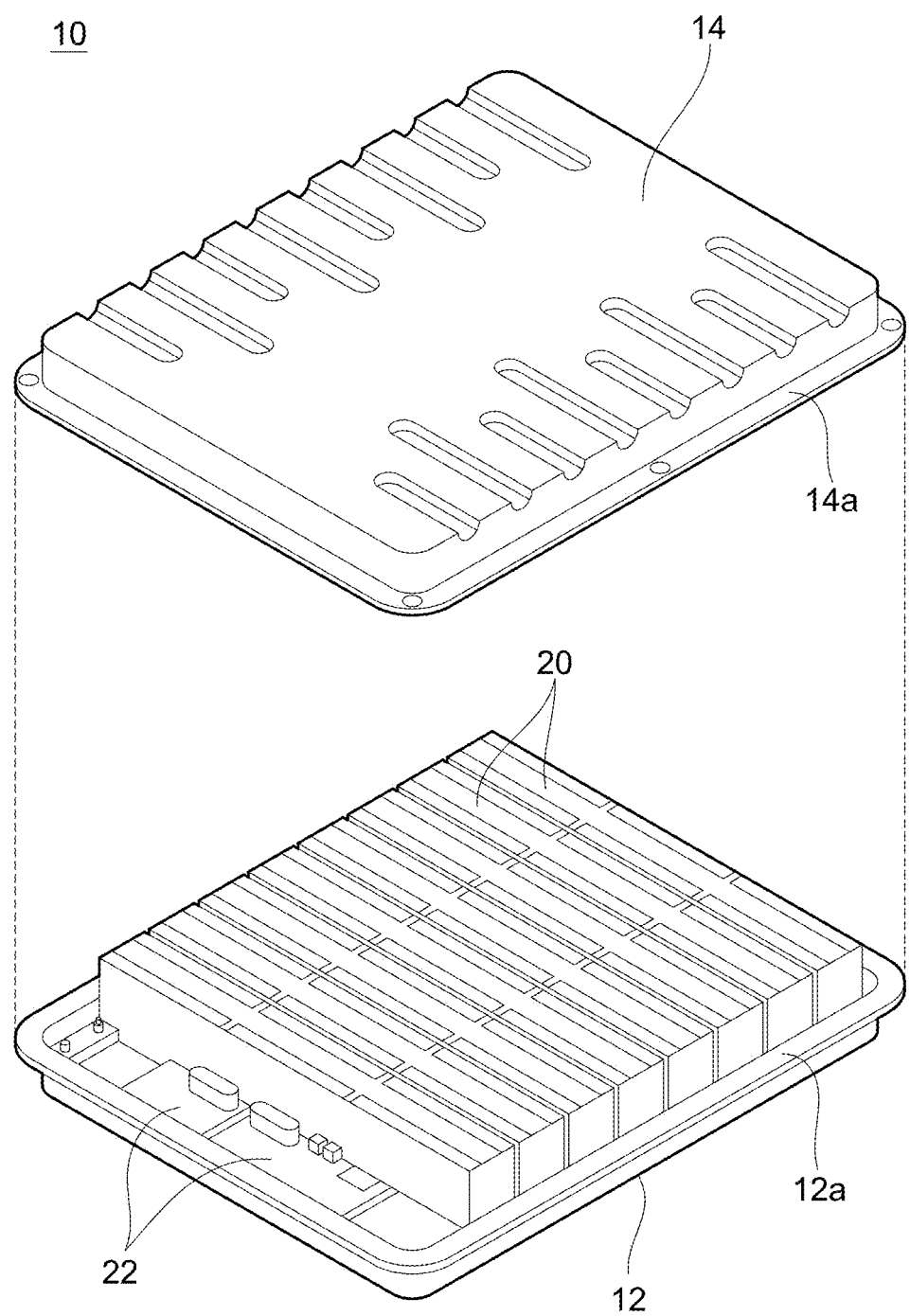
FIG. 2 is a perspective view of the battery pack according to the embodiment in a disassembled state.

FIGS. 1 and 2 show a battery pack 10 according to an embodiment. A casing of the battery pack 10 includes a tray 12 and a cover 14. The tray 12 has a cup shape. A peripheral portion 12a of the tray 12 has a flange shape. The cover 14 has a cap shape. A peripheral portion 14a of the cover 14 has a flange shape. The peripheral portion 14a of the cover 14 is connected to the peripheral portion 12a of the tray 12. As shown in FIG. 2, the casing houses battery cells 20 and a junction box 22 therein. The junction box 22 includes terminals connected to respective battery cells 20 and a relay. Power from the battery cells 20 is supplied to the outside of the casing via the junction box 22.

Figure 3:
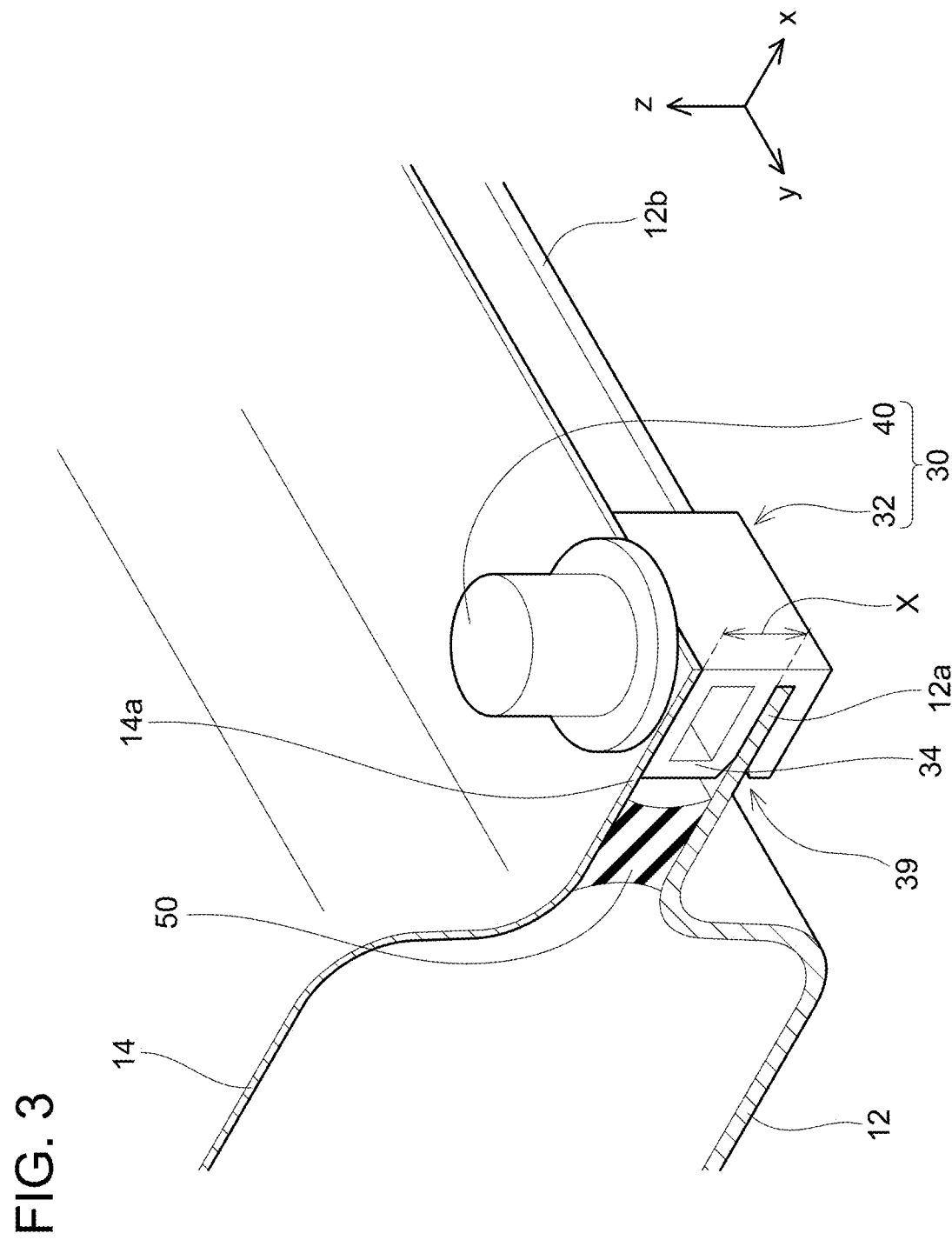
FIG. 3 is a perspective view of a connection member.

As shown in FIG. 1, connection members 30 are disposed at regular intervals in a peripheral portion of the casing. The connection members 30 are constituted of resin. The connection members 30 connect the peripheral portion 12a of the tray 12 and the peripheral portion 14a of the cover 14 to each other. As shown in FIG. 3, each connection member 30 includes a main body 32 and a cap 40. Hereinafter, in a state where the connection members 30 are attached to the casing, a direction from the inside of the casing toward the outside thereof will be termed an x-direction, a longitudinal direction of a peripheral end surface 12b of the tray 12 will be termed a y-direction, and a thickness direction of the casing (direction along which the tray 12 and the cover 14 are stacked) will be termed a z-direction.

Figure 4:
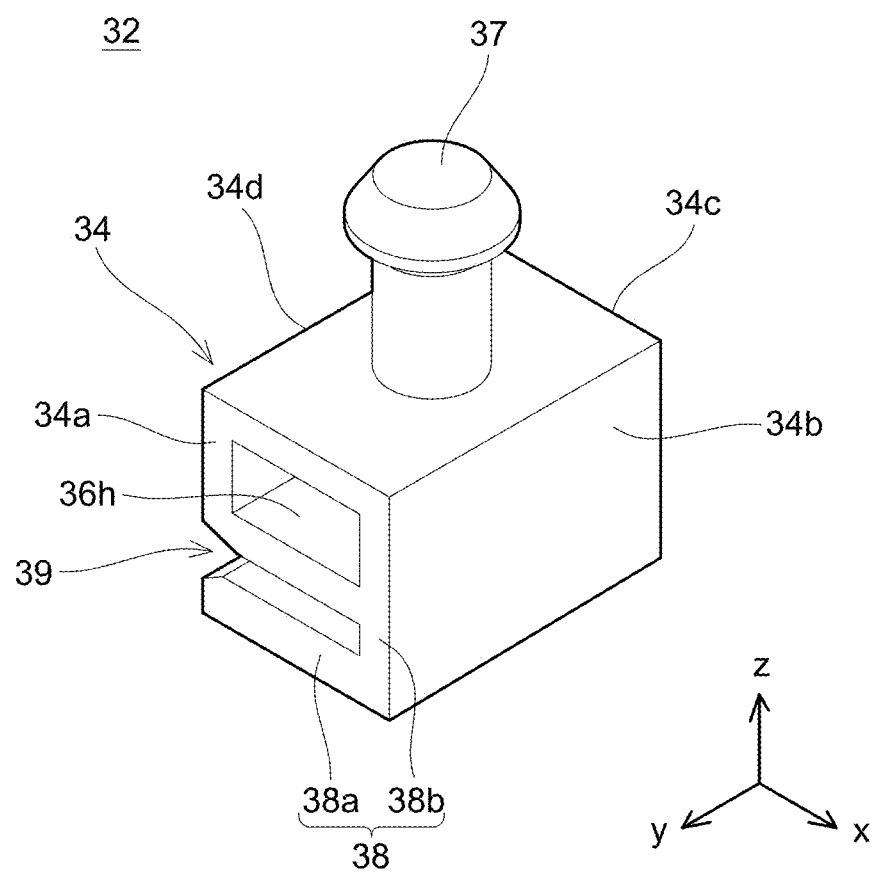
FIG. 4 is a perspective view of a main body of the connection member.
Figure 5:
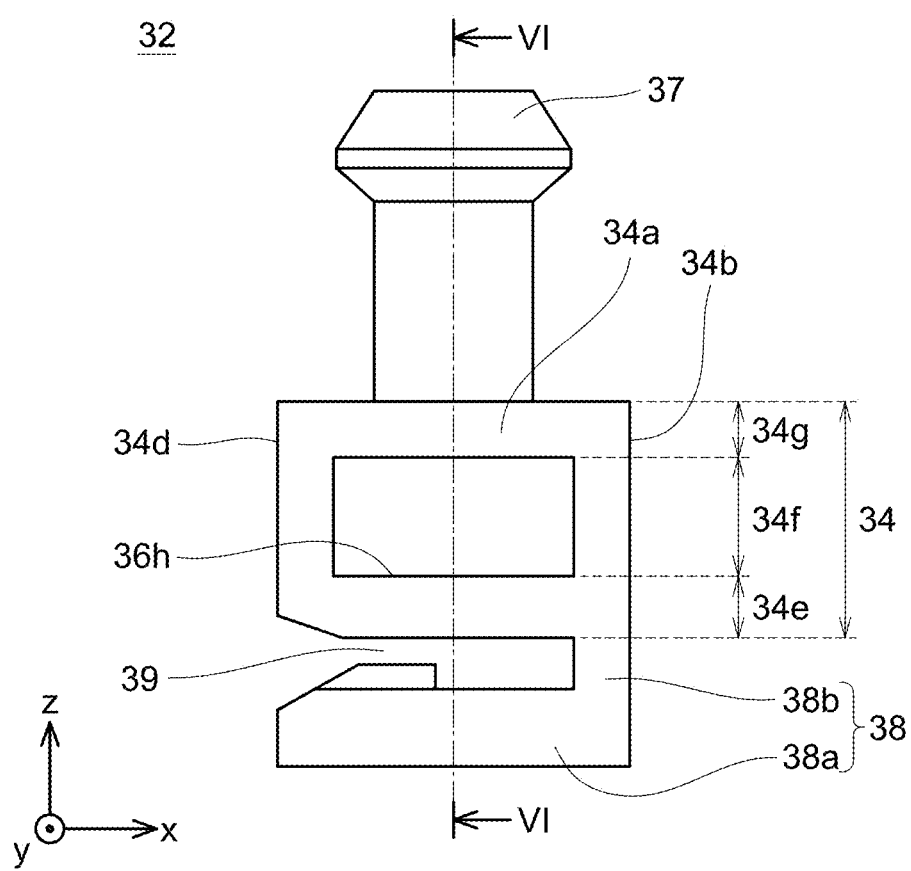
FIG. 5 is a plan view showing a side surface of the main body of the connection member.
Figure 6:
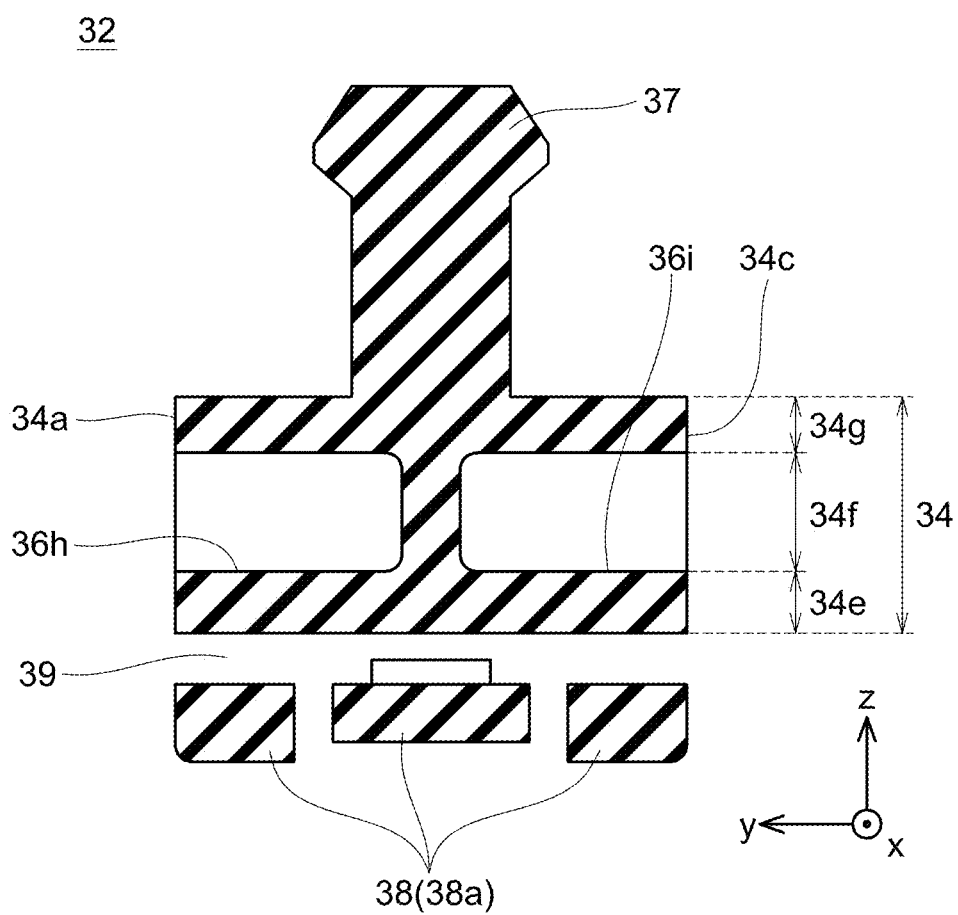
FIG. 6 is a cross-sectional view along a line VI-VI in FIG. 5.

As shown in FIG. 3, each main body 32 includes a spacer 34. The spacer 34 is a portion located within a range X along the z-direction between an upper surface of the peripheral portion 12a and a lower surface of the peripheral portion 14a. The spacer 34 has a substantially cuboid shape. As shown in FIGS. 4 to 6, each main body 32 includes a protrusion 37 and a clip 38. The protrusion 37 is a portion that protrudes upward from an upper surface of the spacer 34. The protrusion 37 has a substantially cylindrical shape and its diameter is increased at a distal end of the protrusion 37. The clip 38 includes a plurality of support portions 38a and a connection portion 38b. Each support portion 38a is disposed below the spacer 34. A clearance 39 is provided between each support portion 38a and the spacer 34. The connection portion 38b connects the support portions 38a and the spacer 34 to each other. The connection portion 38b is disposed at one end of the clearance 39. Another end of the clearance 39 is open.

Figure 7:
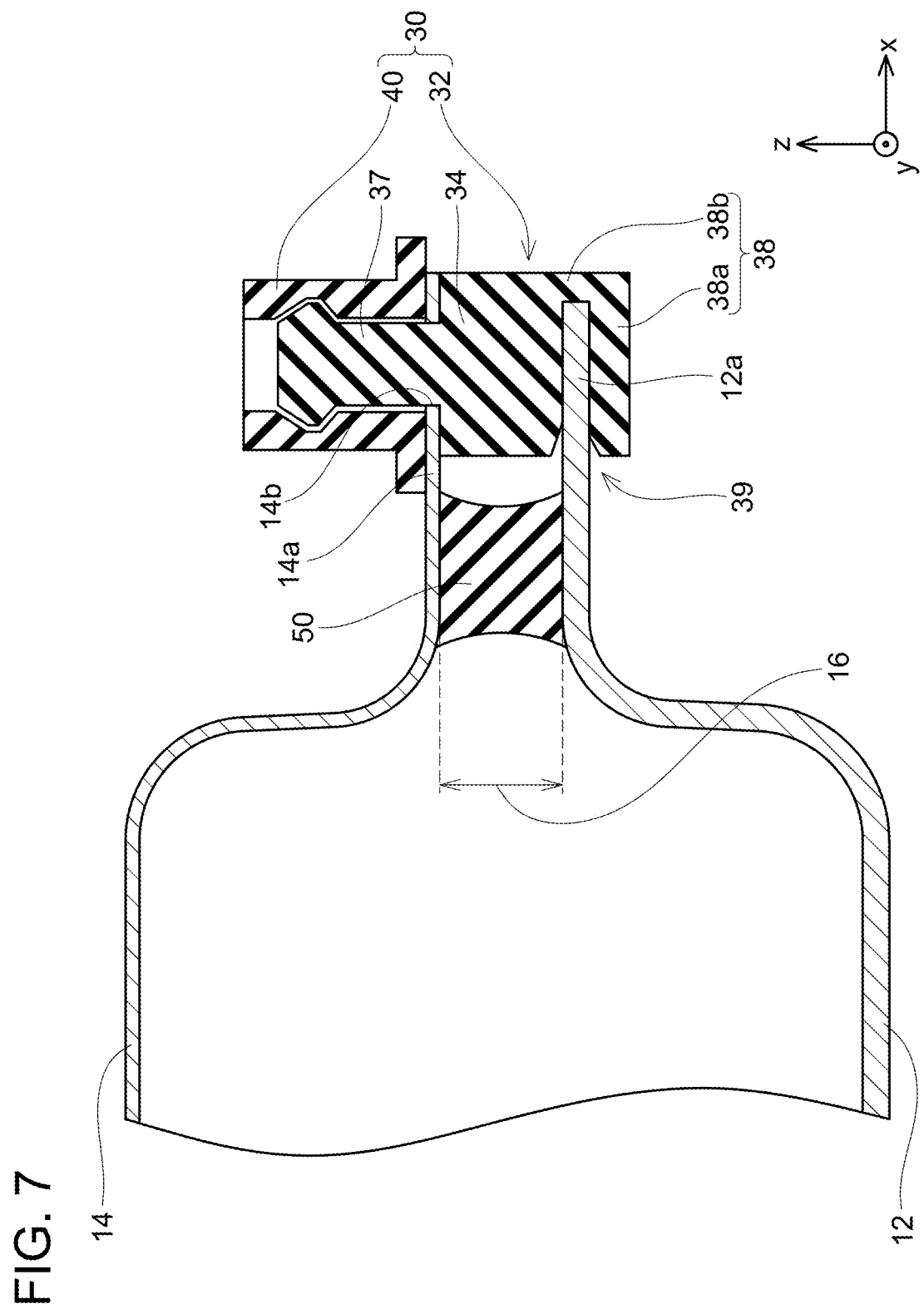
FIG. 7 is an enlarged cross-sectional view for a connected site.

As shown in FIGS. 3 and 7, the peripheral portion 12a of the tray 12 is inserted in the clearance 39 of each of the connection members 30. The peripheral portion 12a of the tray 12 is held between each set of the spacer 34 and the support portions 38a of the clip 38. This is how the connection members 30 are fixed to the peripheral portion 12a. Further, as shown in FIG. 7, the peripheral portion 14a of the cover 14 is provided with through holes 14b. Each protrusion 37 passes through corresponding one of the through holes 14b. Each cap 40 is placed over a part of its corresponding protrusion 37 that protrudes upward from the through hole 14b (i.e., from the peripheral portion 14a). The cap 40 is thereby fixed to the protrusion 37. The peripheral portion 14a of the cover 14 is held by the spacers 34 and the caps 40. This is how the connection members 30 are fixed to the peripheral portion 14a of the cover 14. The connection members 30 each connect the peripheral portion 12a of the tray 12 and the peripheral portion 14a of the cover 14 to each other.

Since the peripheral portion 12a of the tray 12 and the peripheral portion 14a of the cover 14 are connected to each other by the connection members 30 as described above, each of the spacers 34 is held between the peripheral portion 12a and the peripheral portion 14a as shown in FIG. 7. Thus, a clearance 16, which has approximately the same size as a thickness of the spacers 34, is provided between the peripheral portion 12a and the peripheral portion 14a. As described, the connection members 30 connect the peripheral portion 12a and the peripheral portion 14a to each other with the clearance 16 provided between the peripheral portion 12a and the peripheral portion 14a.

Figure 8:
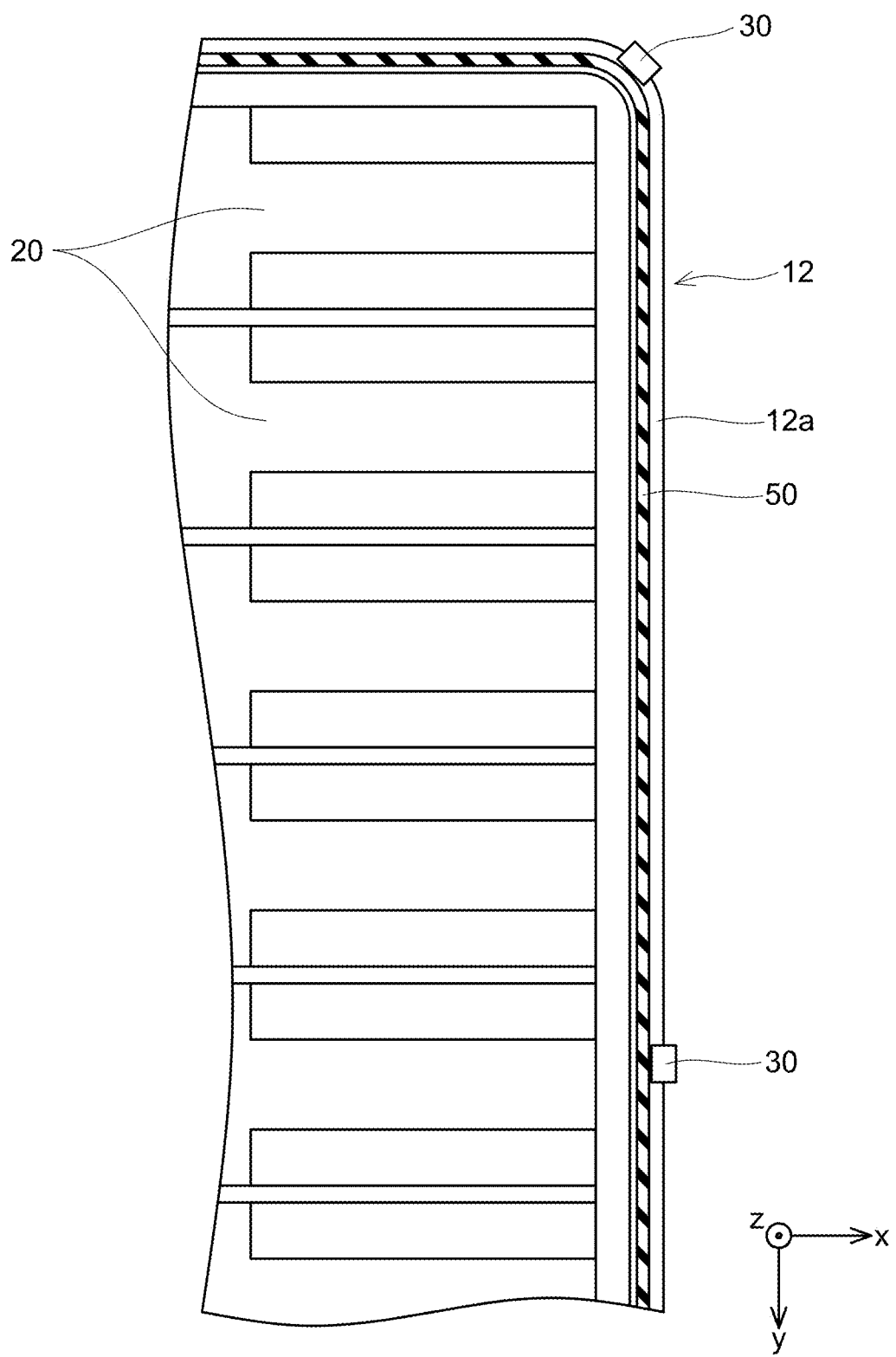
FIG. 8 is an enlarged view of a peripheral portion of a tray.

As shown in FIGS. 3 and 7, a sealant 50 is disposed in the clearance 16 between the peripheral portion 12a and the peripheral portion 14a. The sealant 50 is constituted of resin having elastic properties, such as urethane resin, silicon resin, and the like. The sealant 50 is softer than the connection members 30. The sealant 50 is located closer to the inside of the casing than the connection members 30. The sealant 50 firmly adheres to the upper surface of the peripheral portion 12a of the tray 12 and also to the lower surface of the peripheral portion 14a of the cover 14. As shown in FIG. 8, the sealant 50 is disposed over the entire periphery of the casing. The sealant 50 sticks the tray 12 and the cover 14 together and seals the clearance 16. The sealant 50 prevents moisture from entering the casing through the clearance 16.

As shown in FIGS. 4 to 6, each of the spacers 34 includes four side surfaces 34a to 34d. The side surfaces 34a and 34c extend in the x-direction. The side surfaces 34b and 34d extend in the y-direction. As shown in FIG. 6, a recess 36h is provided in the side surface 34a, and a recess 36i is provided in the side surface 34c. Hereinafter, as shown in FIGS. 5 and 6, a portion of each spacer 34 that is located below the recesses 36h and 36i will be termed a first portion 34e, a portion of each spacer 34 that is located in the same range as the recesses 36h and 36i in the z-direction will be termed a second portion 34f, and a portion of each spacer 34 that is located above the recesses 36h and 36i will be termed a third portion 34g. When the first portion 34e, the second portion 34f, and the third portion 34g are cut along x-y planes (i.e., planes along the clearance 16 (more specifically, planes parallel to the upper surface of the peripheral portion 12a and the lower surface of the peripheral portion 14a)), a cross-sectional area of the second portion 34f is smaller than cross-sectional areas of the first portion 34e and the third portion 34g because the recesses 36h and 36i are provided in the second portion 34f. The first portion 34e is in contact with the peripheral portion 12a of the tray 12. The third portion 34g is in contact with the peripheral portion 14a of the cover 14. The second portion 34f is located between the first portion 34e and the third portion 34g.

Figure 9:
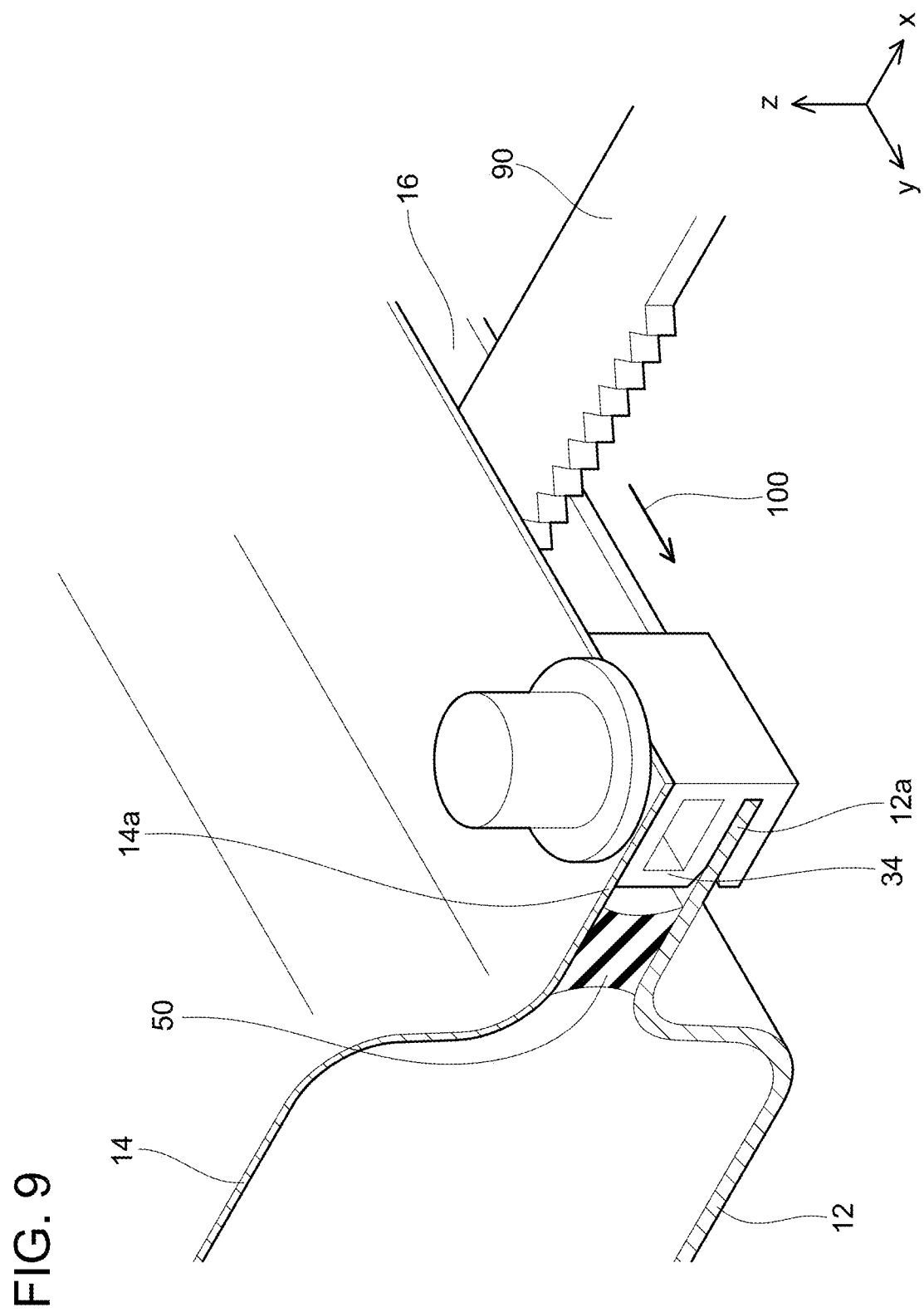
FIG. 9 is an explanatory diagram for a disassembling process of the battery pack.

Next, a method for disassembling the battery pack 10 for maintenance will be described. When a component (e.g., one of the battery cells 20) in the battery pack 10 is deteriorated, the battery pack 10 can be disassembled to replace the deteriorated component. To disassemble the battery pack 10, a saw 90 is inserted into the clearance 16 of the casing as shown in FIG. 9. Since the spacers 34 ensure wide clearance 16, the saw 90 can be inserted into the clearance 16. Since the sealant 50 is soft, a tip of the saw 90 can easily penetrate the sealant 50. Once the saw 90 is inserted in the clearance 16, the saw 90 is moved in a direction indicated by an arrow 100 along the clearance 16 while cutting the sealant 50. When the saw 90 is moved up to one of the connection members 30, the spacer 34 thereof, together with the sealant 50, is cut by the saw 90.

Figure 10:
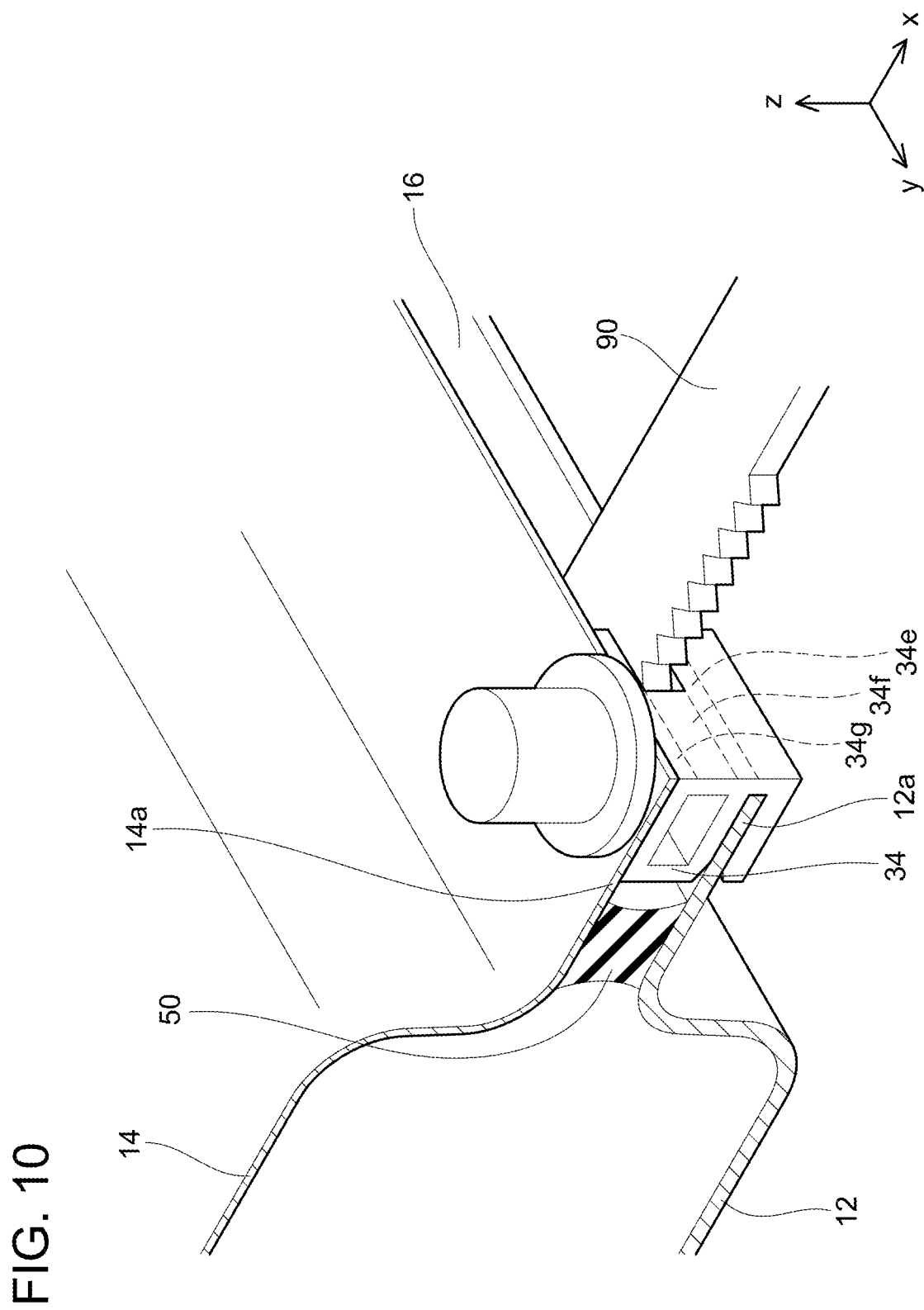
FIG. 10 an explanatory diagram for the disassembling process of the battery pack.

Reaction forces of the spacers 34 may cause the saw 90 to deviate from the track toward the tray 12 or the cover 14. If the saw 90 contacts the tray 12 or the cover 14, the tray 12 or the cover 14 may get damaged. That is, the upper surface of the peripheral portion 12a or the lower surface of the peripheral portion 14a may get damaged. If the upper surface of the peripheral portion 12a or the lower surface of the peripheral portion 14a is damaged, it may not be possible to properly seal the clearance 16 in later assembling of the battery pack 10. To address this, the battery pack 10 according to the embodiment can prevent damage to the tray 12 and the cover 14 as described below. In the battery pack 10 according to the embodiment, each spacer 34 includes the first portion 34e and the third portion 34g having the larger cross-sectional areas and the second portion 34f having the smaller cross-sectional area. The second portion 34f having the smaller cross-sectional area is less resistant to cutting while the first portion 34e and the third portion 34g having the larger cross-sectional areas are more resistant to cutting. Therefore, when the saw 90 contacts the spacer 34, the second portion 34f is preferentially cut while the first portion 34e and the third portion 34g are less likely cut as shown in FIG. 10. Since the second portion 34f is located between the first portion 34e and the third portion 34g, the saw 90 is moved along the second portion 34f by being guided by the first portion 34e and the third portion 34g. In other words, the first portion 34e and the third portion 34g which are less likely cut prevent the saw 90 from moving toward the peripheral portions 12a and 14a. Thus, the saw 90 is less likely to contact the peripheral portions 12a and 14a, and damage to the peripheral portions 12a and 14a can be prevented.

The cover 14 can be removed from the tray 12 by cutting the sealant 50 and the spacers 34 along entire peripheries of the peripheral portions 12a and 14a. Then, a component (e.g., a deteriorated battery cell 20) in the casing can be replaced. Once the component in the casing has been replaced, the cover 14 is fixed to the tray 12. Firstly, new connection members 30 are attached to the peripheral portion 12a of the tray 12. That is, the peripheral portion 12a of the tray 12 is inserted to the clearances 39 of the connection members 30. Further, the sealant 50 is newly applied onto the peripheral portion 12a of the tray 12. Next, the cover 14 is placed onto the tray 12 such that the protrusions 37 of the connection members 30 pass through the through holes 14b of the cover 14. Then, the caps 40 are fitted to the protrusions 37. As a result, the cover 14 is fixed to the tray 12. Thereafter, the sealant 50 is solidified, which completes the assembling of the battery pack 10. Since the battery pack 10 can be disassembled without damage to the tray 12 and the cover 14 as described above, the battery pack 10 can be reused.

Figure 11:
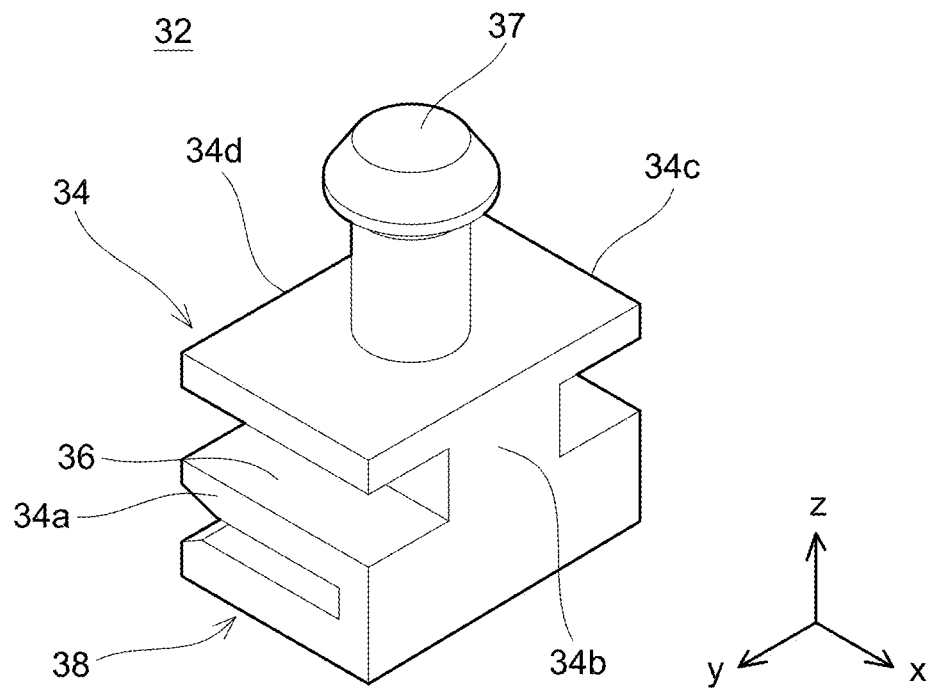
FIG. 11 is a perspective view of a main body of a connection member according to a first variant.
Figure 12:
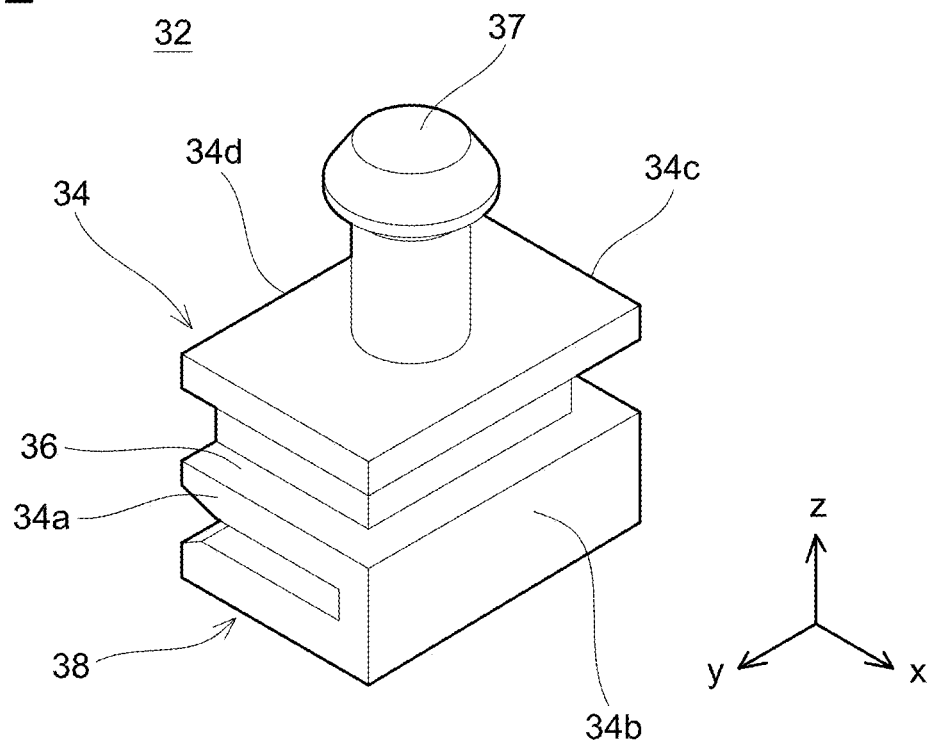
FIG. 12 is a perspective view of a main body of a connection member according to a second variant.
Figure 13:
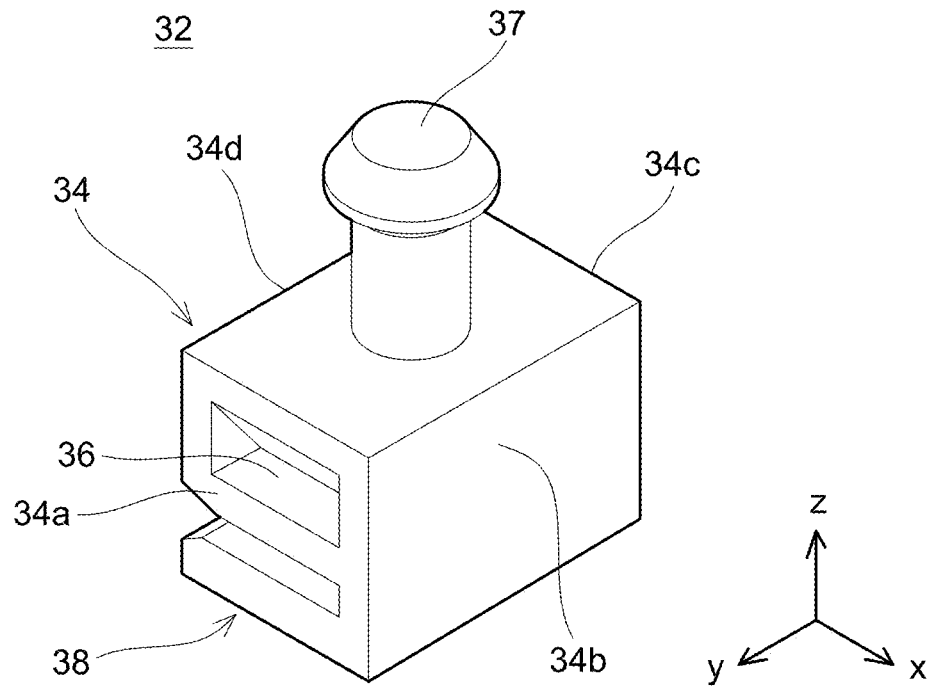
FIG. 13 is a perspective view of a main body of a connection member according to a third variant.
Figure 14:
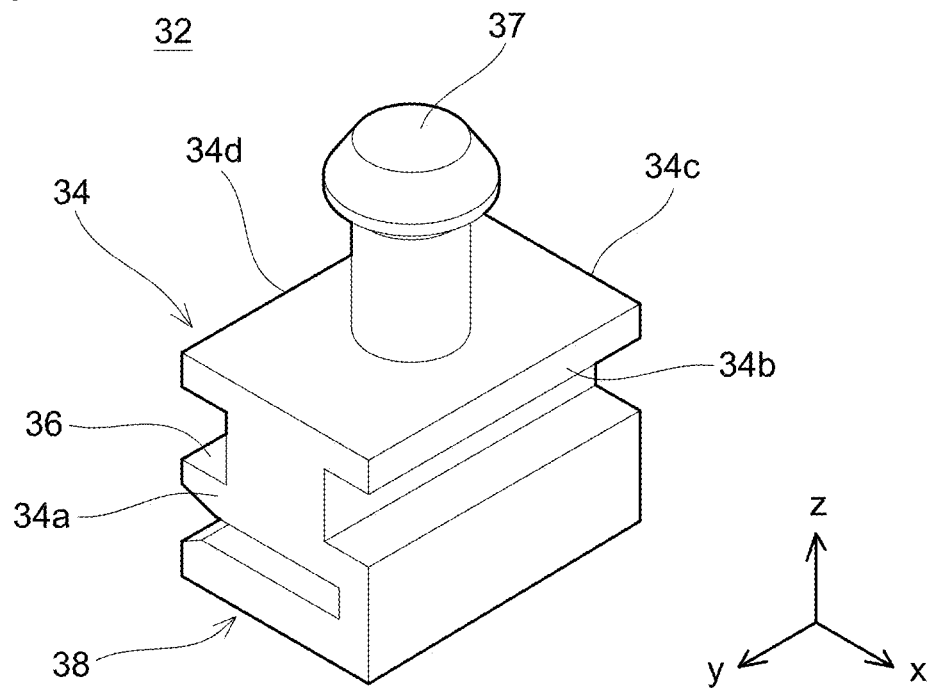
FIG. 14 is a perspective view of a main body of a connection member according to a fourth variant.
Figure 15:
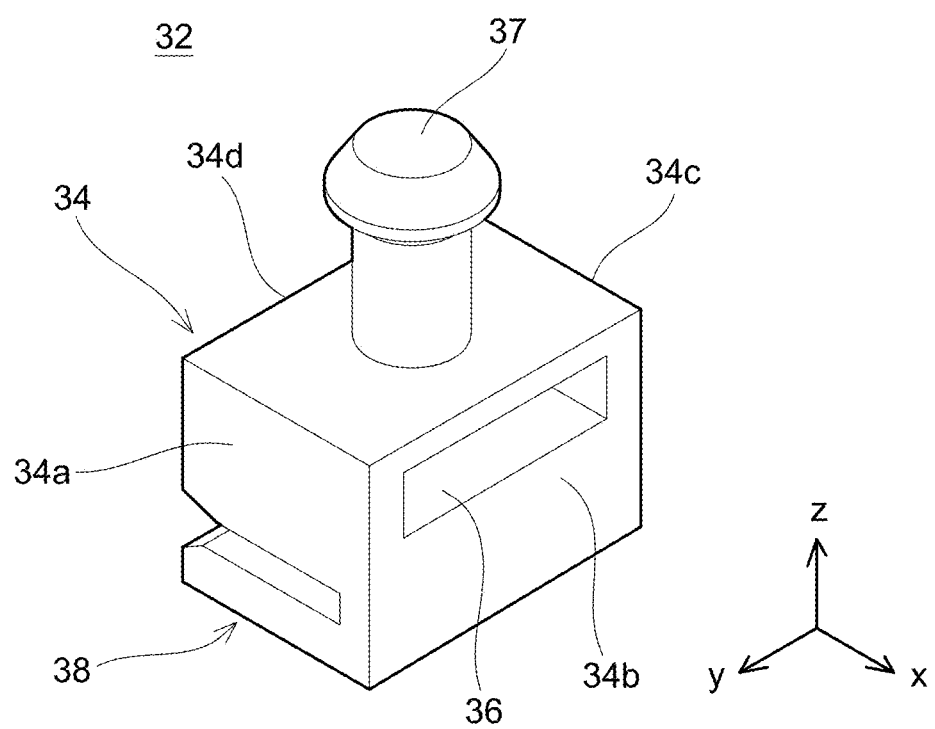
FIG. 15 is a perspective view of a main body of a connection member according to a fifth variant.

The shape of the spacers 34 may be different from the shape described in the above embodiment. For example, as shown in FIG. 11, recesses 36 may traverse the side surfaces 34a and 34c respectively, in form of grooves. Alternatively, as shown in FIG. 12, a recess 36 may continuously extend over the side surfaces 34a to 34d. Alternatively, as shown in FIG. 13, an inner surface of a recess 36 may extend obliquely. Alternatively, as shown in FIG. 14, recesses 36 may be provided in the side surfaces 34b and 34d respectively, in form of grooves that reach the side surfaces 34a and 34c. In any of the configurations of FIGS. 4 and 11 to 14, each recess 36 is exposed at the side surfaces 34a and 34c, thus when the saw 90 contacts the side surface 34a or the side surface 34c, the saw 90 is easily guided along the second portion 34f. In another configuration, as shown in FIG. 15, recesses 36 may be provided in the side surfaces 34b and 34d respectively, and the recesses 36 may not be exposed at the side surface 34a nor the side surface 34c. The cross-sectional area of the second portion may be reduced by providing a cavity inside the spacer in the second portion. The cross-sectional area of the second portion may be reduced by providing a through hole in the spacer in the second portion.

Figure 16:
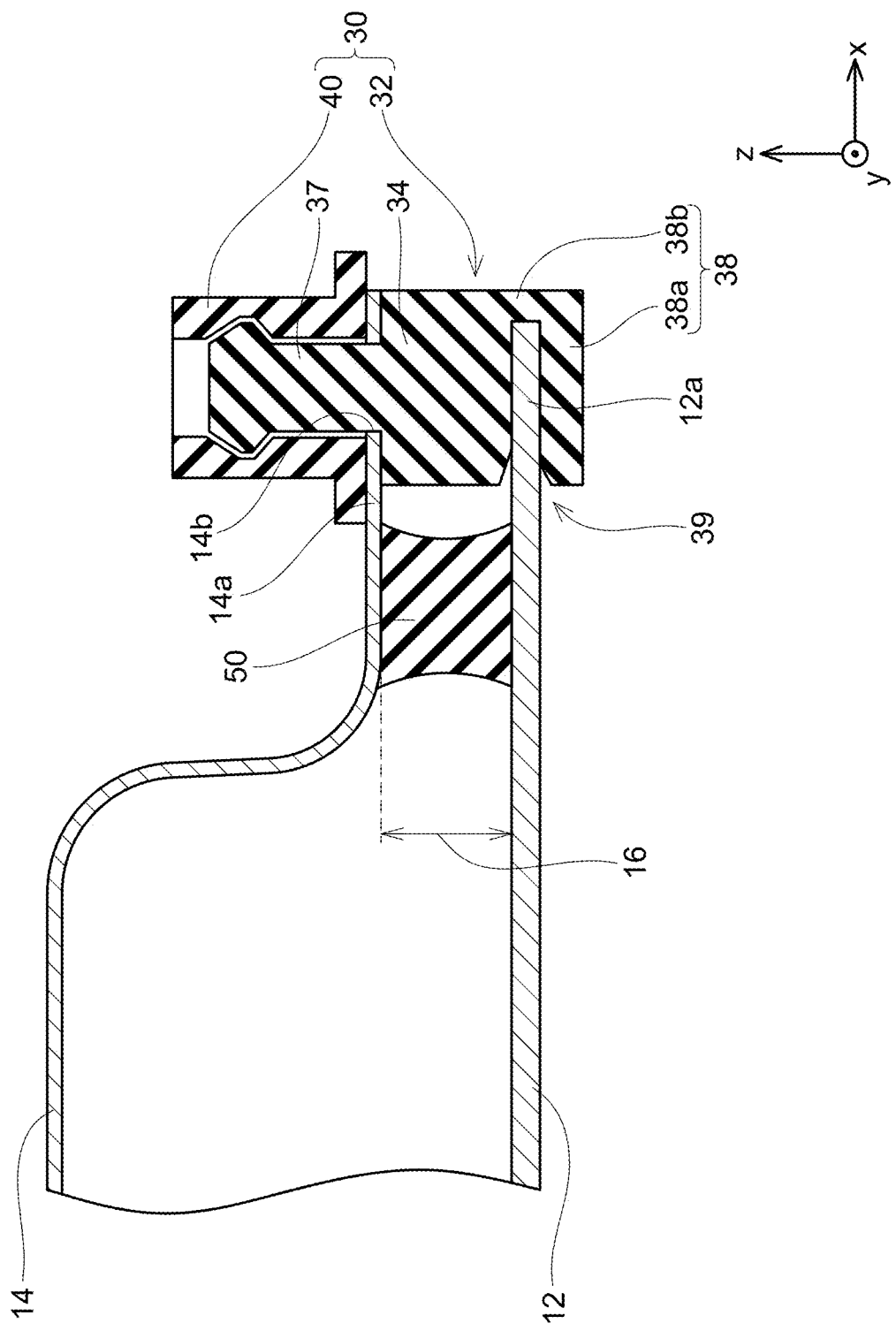
FIG. 16 is a cross-sectional view of a battery pack according to a sixth embodiment.

In the above embodiment, the tray 12 has a cup shape, however, the tray 12 may be flat as shown in FIG. 16.

Figure 17:
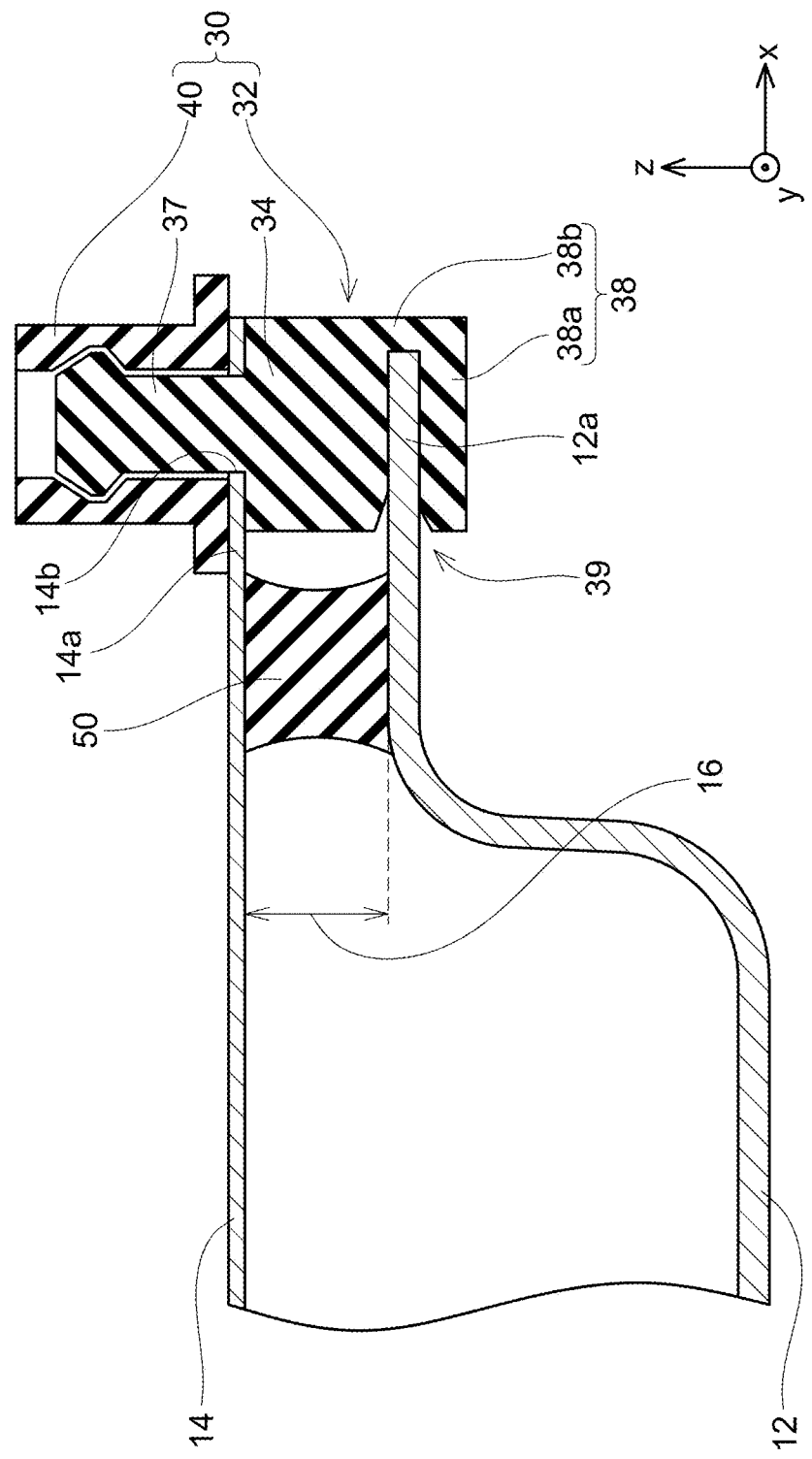
FIG. 17 is a cross-sectional view of a battery pack according to a seventh embodiment.

Further, in the above embodiment, the cover 14 has a cap shape, however, the cover 14 may be flat as shown in FIG. 17.

Some of the technical elements described herein will be listed. It should be noted that the respective technical elements are independent of one another, and are useful solely or in combinations.

In an aspect of the disclosure herein, a recess may be provided in a side surface of the spacer in a range of the second portion.

This configuration enables reduction in the cross-sectional area of the second portion.

In an aspect of the disclosure herein, the recess may be exposed at a portion of the side surface that extends from inside to outside of the battery pack.

This configuration facilitates movement of the saw along the second portion when the spacer is cut by the saw.

A method of disassembling an exemplary battery pack disclosed herein may comprise cutting the spacer and the sealant by inserting a saw into the clearance and moving the inserted saw along the clearance.

This method prevents damage to the tray and the cover.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A battery pack comprising:
   a tray comprising a peripheral portion;
   a cover covering the tray and comprising a peripheral portion that faces the peripheral portion of the tray;
   a connection member connecting the peripheral portion of the tray and the peripheral portion of the cover to each other with a clearance provided between the peripheral portion of the tray and the peripheral portion of the cover; and
   a sealant filling the clearance,
   wherein
   the connection member comprises a spacer disposed in a range between the peripheral portion of the tray and the peripheral portion of the cover in a direction along which the tray and the cover are stacked,
   the spacer comprises a first portion having a first cross-sectional area in a cross section of the spacer along a plane parallel to the clearance, a second portion having a second cross-sectional area in a cross section of the spacer along a plane parallel to the clearance, and a third portion having a third cross-sectional area in a cross section of the spacer along a plane parallel to the clearance,
   the second cross-sectional area is smaller than the first cross-sectional area and the third cross-sectional area,
   the first portion is disposed at a position that is in contact with the peripheral portion of the tray,
   the third portion is disposed at a position that is in contact with the peripheral portion of the cover, and the second portion is disposed between the first portion and the third portion.

2. The battery pack of claim 1, wherein a recess is provided in a side surface of the spacer in a range of the second portion.

3. The battery pack of claim 2, wherein the recess is exposed at a portion of the side surface, the portion extending from inside to outside of the battery pack.

4. A method of disassembling the battery pack of claim 1, the method comprising cutting the spacer and the sealant by inserting a saw into the clearance and moving the inserted saw along the clearance.

* * * * *